US009239244B1

(12) United States Patent
Chen

(10) Patent No.: US 9,239,244 B1
(45) Date of Patent: Jan. 19, 2016

(54) DEVICE CAPABLE OF SHOWING BOTH NAVIGATION AND SAFE DRIVING WARNING INFORMATION

(71) Applicant: E-LEAD ELECTRONIC CO., LTD., Changhua (TW)

(72) Inventor: Stephen Chen, Changhua (TW)

(73) Assignee: E-Lead Electronics Co., Ltd., Changhua (CN)

( * ) Notice: Subject to any disclaimer, the term of this patent is extended or adjusted under 35 U.S.C. 154(b) by 0 days.

(21) Appl. No.: 14/486,572

(22) Filed: Sep. 15, 2014

(51) Int. Cl.
*G01C 21/36* (2006.01)
*B60Q 5/00* (2006.01)

(52) U.S. Cl.
CPC ............. *G01C 21/3647* (2013.01); *B60Q 5/006* (2013.01); *G01C 21/365* (2013.01); *G01C 21/3697* (2013.01)

(58) Field of Classification Search
CPC . G01C 21/3647; G01C 21/3697; B60Q 5/006
USPC ........................................................ 701/400
See application file for complete search history.

(56) References Cited

U.S. PATENT DOCUMENTS

2009/0187333 A1* 7/2009 Mueller .......... 701/200
2011/0202240 A1* 8/2011 Rottner et al. .......... 701/42
2012/0072097 A1* 3/2012 Ohta et al. .......... 701/118
2012/0123613 A1* 5/2012 Waki et al. .......... 701/1
2012/0314055 A1* 12/2012 Kataoka .......... 348/117
2014/0063064 A1* 3/2014 Seo et al. .......... 345/633
2014/0285364 A1* 9/2014 Chen .......... 340/988

FOREIGN PATENT DOCUMENTS

CN   201069359 Y  *  6/2008
TW   200742689 A     11/2007
TW   200848703 A     12/2008

OTHER PUBLICATIONS

English translation of CN 201069359 Y.*

* cited by examiner

*Primary Examiner* — Fadey Jabr
*Assistant Examiner* — Yazan A Soofi
(74) *Attorney, Agent, or Firm* — Wang Law Firm, Inc.; Li K. Wang; Stephen Hsu

(57) ABSTRACT

A device capable of showing both navigation and safe driving warning information includes a computer, a display unit, a video camera, and a navigation unit. The information captured by the video camera, and the navigation unit and a safe driving warning unit are processed by the computer and then can be simultaneously displayed on the single display unit, so that the driver can see sufficient information, including real time road condition, navigation information, and safe driving information, directly from the display unit without having to look at different positions to see different information, thus improving driving safety.

10 Claims, 7 Drawing Sheets

DEVICE CAPABLE OF SHOWING BOTH NAVIGATION AND SAFE DRIVING WARNING INFORMATION

BACKGROUND OF THE INVENTION

1. Field of the Invention

The present invention relates to a navigation device, and more particularly to a device capable of showing both navigation and safe driving warning information.

2. Description of the Prior Art

Focus is the most important thing to ensure safe driving. With the development of network information, and the popularity of mobile devices, navigation device or mobile devices using navigation software has almost become a necessity when it comes to driving. It will jeopardize the safety of driving when a driver is distracted during driving by bending head down to read the navigation information.

To reduce the safety hazards associated with the fact that the driver will be distracted during driving by looking down at the dashboard or the navigation device, head up display was invented and has been installed on some of the luxury cars. However, the head up display is too expensive to be widely used. Besides, with the current technology, the head up display is unable to display sufficient driving information, which also affects the willingness of the consumers' buy.

Taiwan Patent publication No. 200742689 also discloses "driveway safety monitoring device and method", which essentially comprises a video camera, and the video image shows the safe distance to the front car, so as to remind the driver to keep a safe distance from the front car, thus ensuring safe driving. Taiwan Patent publication No. 20084870 discloses a "navigation assistant device using video camera", which is also used in combination with a video camera and the navigation information is also displayed on the video image, so that the driver can see the road condition and read the navigation information by watching the video image. However, this driveway safety monitoring device is still unable to show sufficient information on the real driving condition, navigation information and safe driving warning information.

The present invention has arisen to mitigate and/or obviate the afore-described disadvantages.

SUMMARY OF THE INVENTION

The primary objective of the present invention is to provide a device capable of showing both navigation and safe driving warning information, which solves the problem that the conventional display device is unable to display sufficient safe driving related information.

To achieve the above objective, a device capable of showing both navigation and safe driving warning information in accordance with the present invention comprises:

a computer;

a display unit electrically connected to the computer;

a video camera electrically connected to the computer to monitor the road condition in front of a host vehicle which is equipped with the device, images captured by the video camera being processed into a road condition video by the computer and then displayed on the display unit;

a navigation unit electrically connected to the computer and having functions of destination guidance and route planning based on a planed destination, the computer being capable of processing the information from the navigation unit into navigation information which is then shown on the display unit, the navigation information including image data and text data, the road condition video and the navigation information being simultaneously displayed on the display unit in such a manner that the road condition video is displayed as a background and the road information floating over it, the computer including a safe driving warning unit which is controlled by the computer to display a safe-distance-to-the-front-vehicle marking on the display unit, and the safe-distance-to-the-front-vehicle marking to the front vehicle is displayed over the road condition video and includes two straight lines which change length when the host vehicle change speed.

The present invention can use the display unit to simultaneously display the road condition video and the navigation information, so that the driver can see sufficient safe driving information directly from the display unit without having to look at different positions to see different information, thus improving driving safety. Besides, the device of the present invention can be independently installed on any vehicle, so as to improve the applicability.

DETAILED DESCRIPTION OF THE PREFERRED EMBODIMENTS

Figure 1:
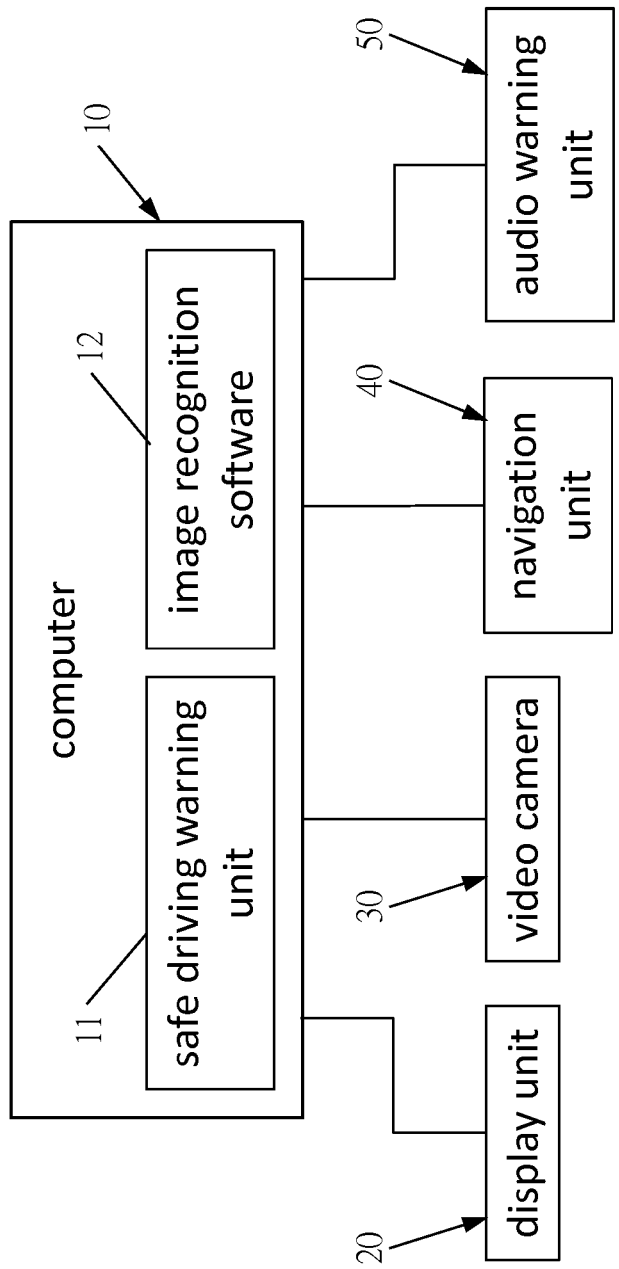
FIG. 1 is a flow chart illustrating a device capable of showing both navigation and safe driving warning information in accordance with the present invention.

The present invention will be clearer from the following description when viewed together with the accompanying drawings, which show, for purpose of illustrations only, the preferred embodiment in accordance with the present invention.

Referring to FIGS. 1-7, a device capable of showing both navigation and safe driving warning information in accordance with the present invention comprises: a computer 10, a display unit 20, a video camera 30, and a navigation unit 40.

The display unit 20 is electrically connected to the computer 10.

The video camera 30 is electrically connected to the computer 10 to monitor the road condition in front of the host vehicle. The images captured by the video camera 30 is processed into a road condition video F1 by the computer 10 and is then displayed on the display unit 20. The road condition video F1 includes real ambient environment images and the images of the vehicles in front of the host vehicles. The road condition video F1 further includes a road marking line 116.

The navigation unit 40 is electrically connected to the computer 10 and provides the functions of destination guidance and route planning based on the destination. The computer 10 is capable of processing the information from the navigation unit 40 into navigation information F2 which is then shown on the display unit 20. The navigation information F2 includes image data F21 and text data F22. The image data F21 is an arrow used to direct the host vehicle to next crossing. The text data F22 can be displayed at different positions to represent different information. In this embodiment, the text data F22 includes the name F221 of the current road shown beneath the center of the display unit 20, the name of and the distance to the next road F222 shown in the first row at the upper left of the display unit 20, and the name of and the distance to the next second road F223 shown in the second row at the upper left of the display unit 20. The road condition video F1 and the navigation information F2 are simultaneously displayed on the display unit 20 in such a manner that the road condition video F1 is displayed as a background and the navigation information F2 floating over it.

The computer 10 includes a safe driving warning unit 11 and an image recognition software 12. The safe driving warning unit 11 is controlled by the computer 10 to display a safe-distance-to-the-front-vehicle marking 111 on the display unit 20. The safe-distance-to-the-front-vehicle marking 111 to the front vehicle is displayed over the road condition video F1 and includes two straight lines parallel to the road marking line 116. The computer 10 combines and displays all the data which have been processed by the save driving warning unit 11 and the image recognition software 12 on the display unit 20.

The computer 10 uses the safe driving warning unit 11 to display the safe-distance-to-the-front-vehicle marking 111, a lane deviation warning marking 112, a speed limit marking 113 and a speed marking 114 displaying the current speed of the host vehicle. The computer 10 controls the two straight lines of the safe-distance-to-the-front-vehicle marking 111 to change length when the speed of the host vehicle changes. The distance within the safe-distance-to-the-front-vehicle marking 111 represents a safe distance that the host vehicle should be kept from the front vehicle. When the front vehicle is overlapped with the safe-distance-to-the-front-vehicle marking 111, it means that the distance between the host vehicle and the front vehicle is smaller than the safe distance.

The lane deviation warning marking 112 includes two straight lines to show the extended position of the vehicle and is displayed at two sides of the safe-distance-to-the-front-vehicle marking 111 for the user to determine whether the vehicle deviates from the lane. The speed marking 114 indicates the current speed of the vehicle.

The image recognition software 12 is capable of calculating the distance between the host vehicle and the front vehicle based on the image or video taken by the video camera 30. When the image recognition software 12 figures out that the distance between the host vehicle and the front vehicle is smaller than the safe distance, the computer 10 will make the safe-distance-to-the-front-vehicle marking 111 flash or change color.

The computer 10 can further be electrically connected to an audio warning unit 50. When the image recognition software 12 figures out that the distance between the host vehicle and the front vehicle is smaller than the safe distance, the computer 10 will make the audio warning unit 50 produce an alarm in the form of a warning voice or a warning sound. The image recognition software 12 can also calculate the amount of deviation of the vehicle from the lane. When the image recognition software figures out that the deviation amount is big enough to make the host vehicle overlapped with the road marking line 116, the computer 10 will make the audio warning unit 50 produce an alarm in the form of a warning voice or a warning sound.

The road condition video F1 taken by the video camera 30 and the navigation information F2 provided by the navigation unit 40 can be displayed simultaneously on the display unit 20, so that the driver can see the road condition video F1 and the navigation information F2 simultaneously when look at the display unit 20, without the problem of the conventional navigation system that the driver will overlook the road condition when reading the navigation information F2.

During the process of driving, the computer 10 will make the safe driving warning unit 11 display the safe-distance-to-the-front-vehicle marking 111, the lane deviation warning marking 112, the speed limit marking 113 and the speed marking 114 on the display unit 20. The safe-distance-to-the-front-vehicle marking 111 will tell whether the host vehicle is kept at a safe distance from the front vehicle. When the front vehicle is overlapped with the safe-distance-to-the-front-vehicle marking 111, it means that the distance between the host vehicle and the front vehicle is smaller than the safe distance. By looking at the position of the safe-distance-to-the-front-vehicle marking 111 with respect to the front vehicle shown in the road condition video F1, the driver can directly know the condition of the vehicle, then do some adjustment correspondingly, which prevents the occurrence of no warning.

Figure 4:
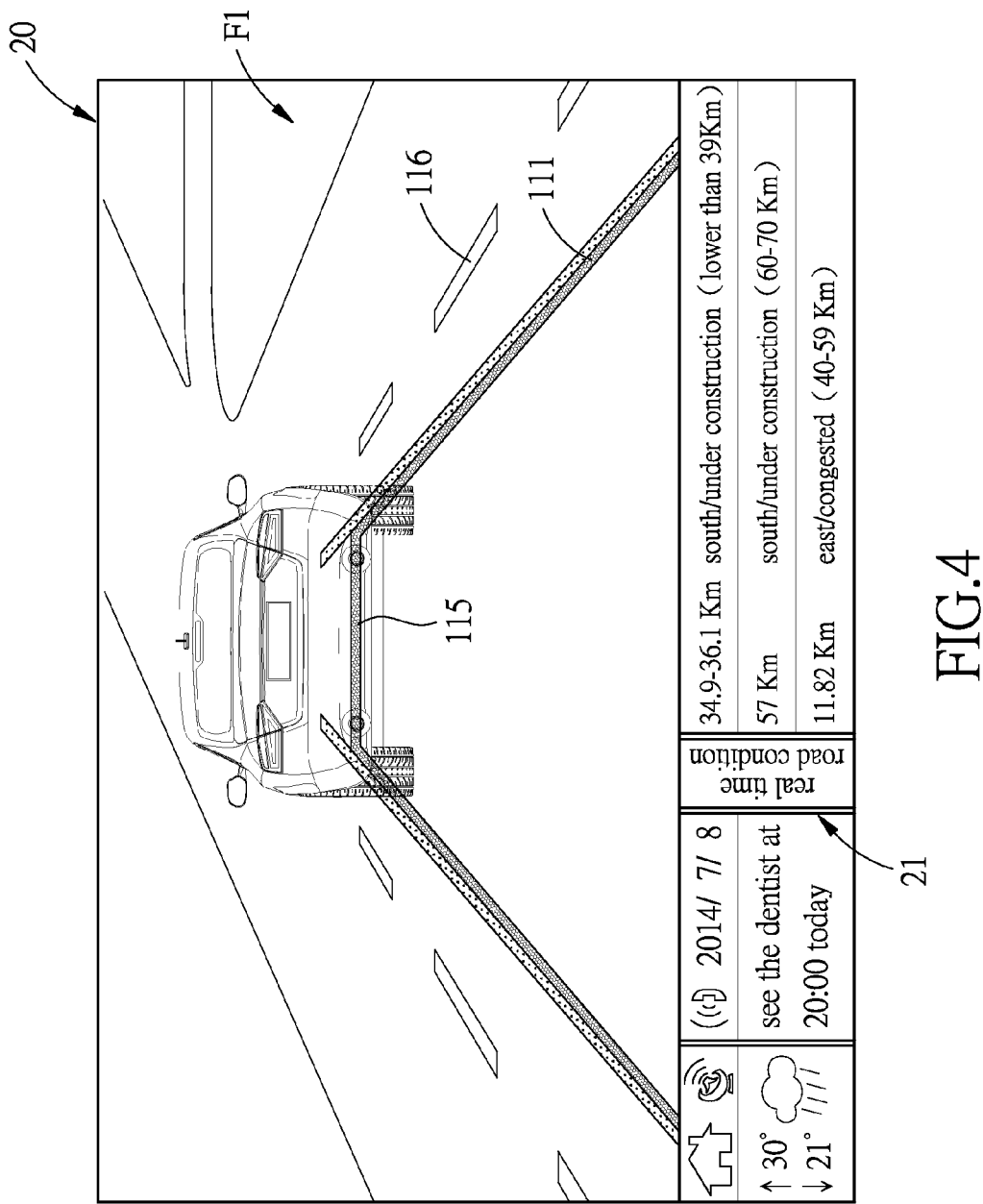
FIG. 4 is an illustrative view of the present invention showing that the distance between the host vehicle and the front vehicle is smaller than the safe distance.

Meanwhile, the image recognition software 12 calculates the distance between the host vehicle and the front vehicle based on the image or video taken by the video camera 30. When the image recognition software 12 figures out that the distance between the host vehicle and the front vehicle is smaller than the safe distance, the computer 10 will make the safe-distance-to-the-front-vehicle marking 111 flash or change color, or make the audio warning unit 50 produce an alarm in the form of a warning voice or a warning sound. This will further prompt the driver to do some adjustment to keep the vehicle at the safe distance or within the driveway. The computer 10 can also uses the display unit 20 to display the road condition video F1, the safe-distance-to-the-front-vehicle marking 111 and the lane deviation warning marking 112 only, as shown in FIG. 4, which makes the driver focus on the safe-distance-to-the-front-vehicle marking 111 and the lane deviation warning marking 112, allowing the driver to correctly and quickly adjust the vehicle to the safe distance while keeping it from deviating from the lane.

Figure 2:
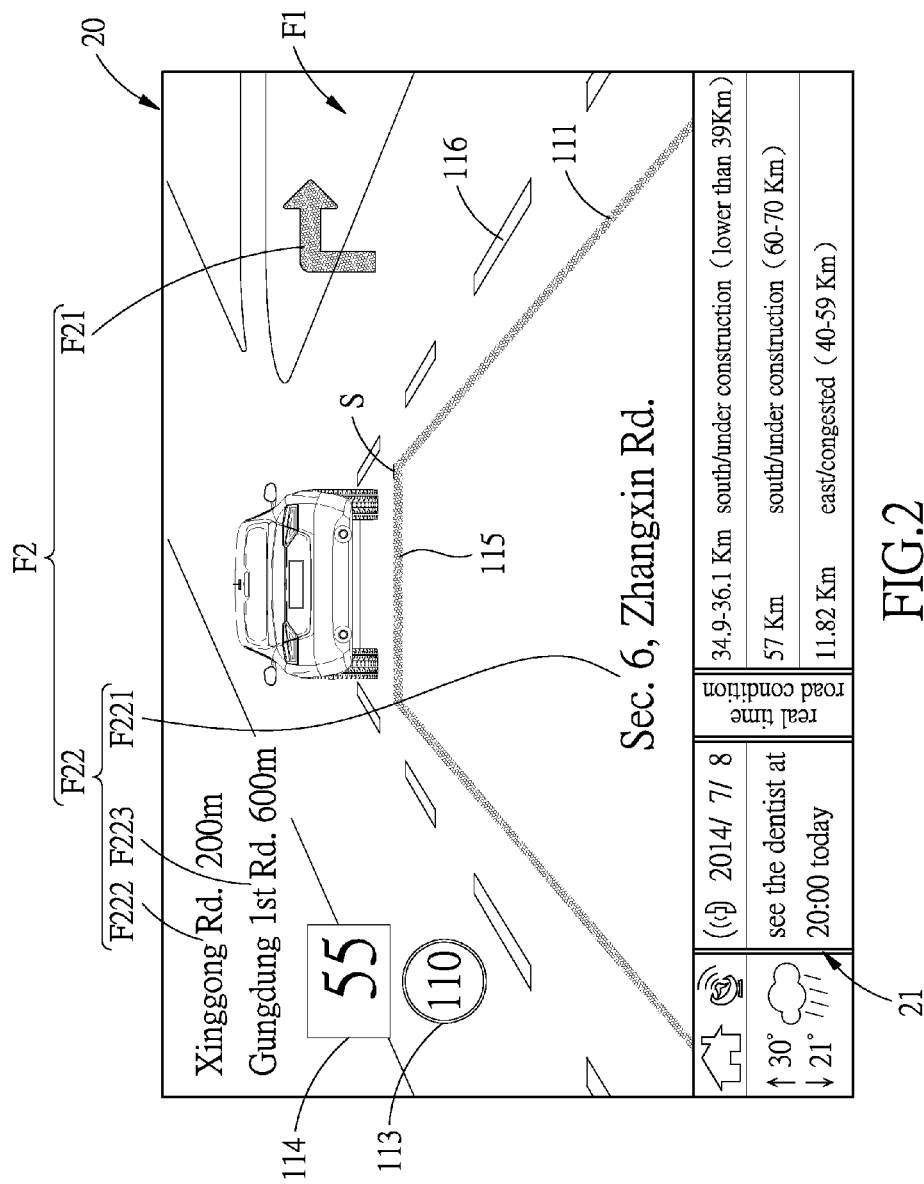
FIG. 2 is an illustrative view of the device capable of showing both navigation and safe driving warning information in accordance with the present invention.
Figure 3:
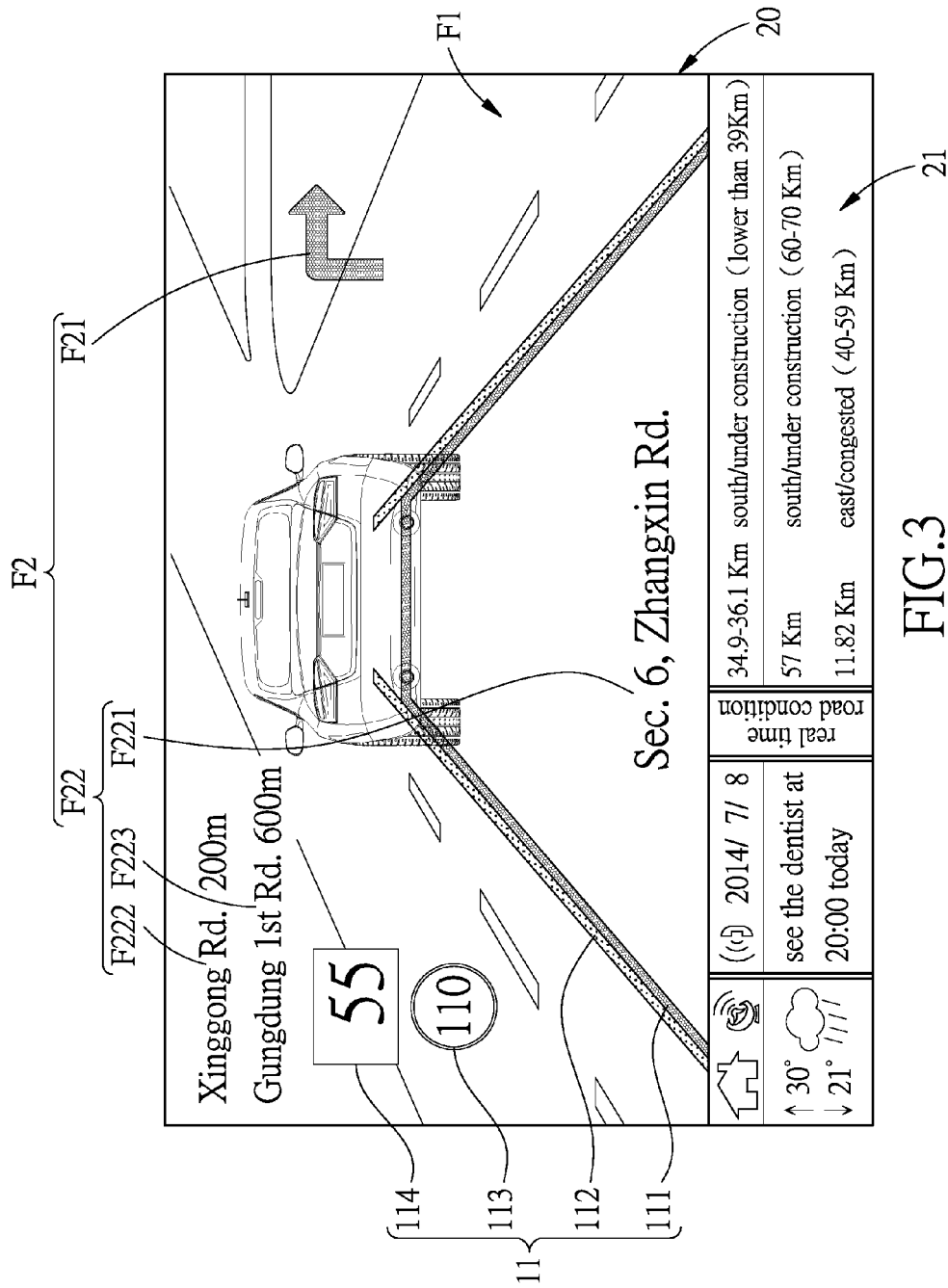
FIG. 3 is another illustrative view of the device capable of showing both navigation and safe driving warning information in accordance with the present invention.
Figure 5:
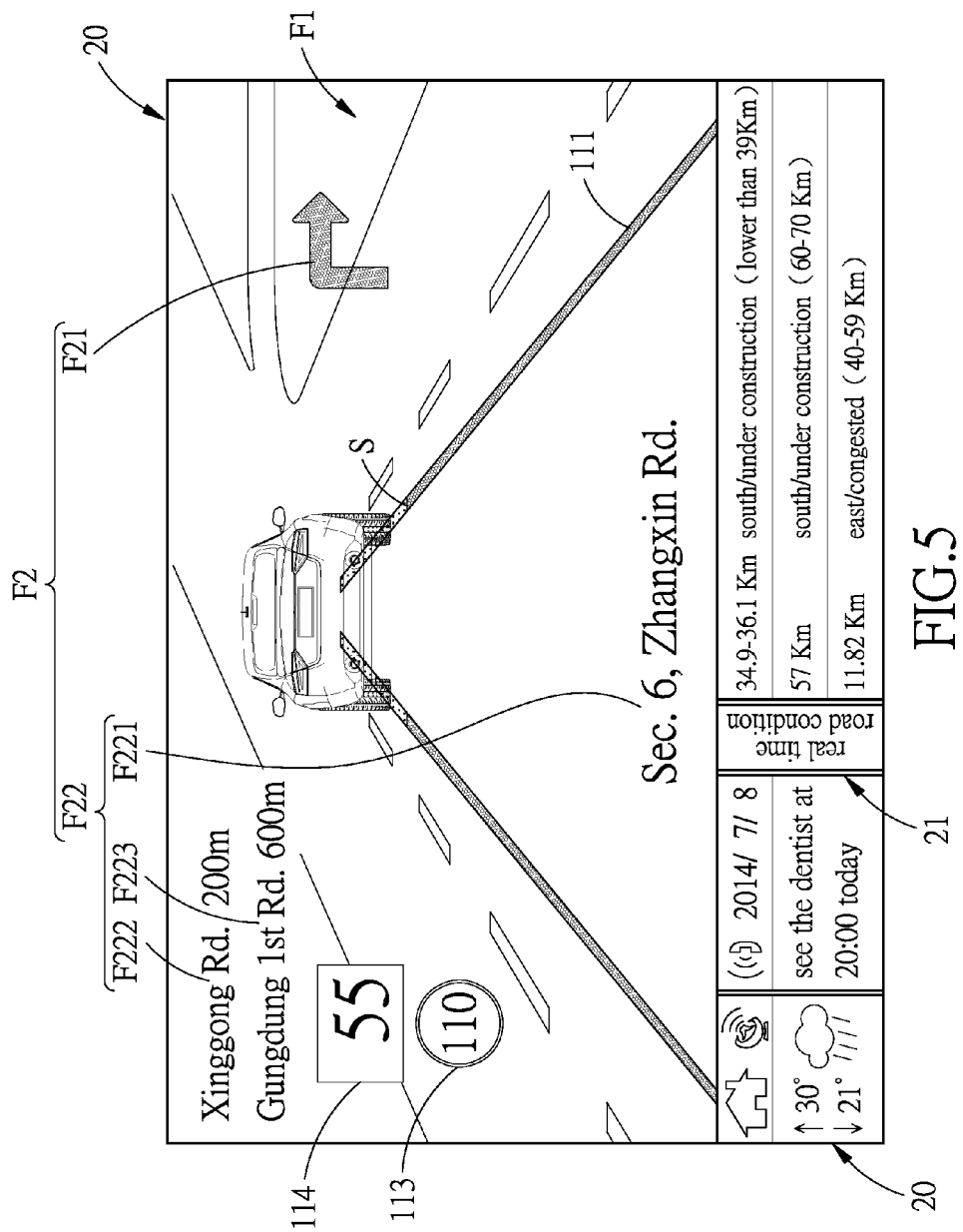
FIG. 5 is an illustrative view of the device capable of showing both navigation and safe driving warning information in accordance with another embodiment of the present invention.
Figure 6:
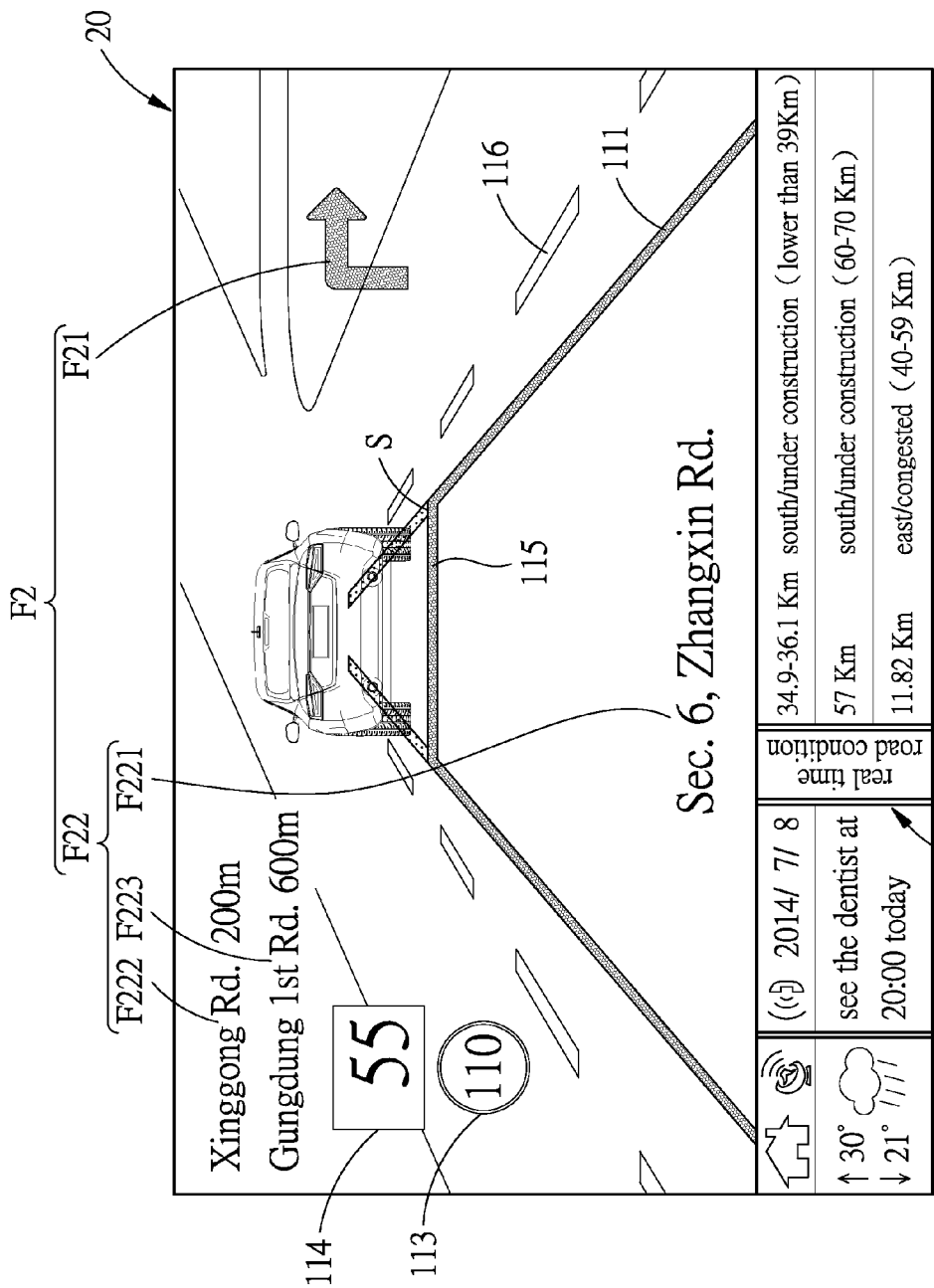
FIG. 6 is an illustrative view of the device capable of showing both navigation and safe driving warning information in accordance with another embodiment of the present invention.
Figure 7:
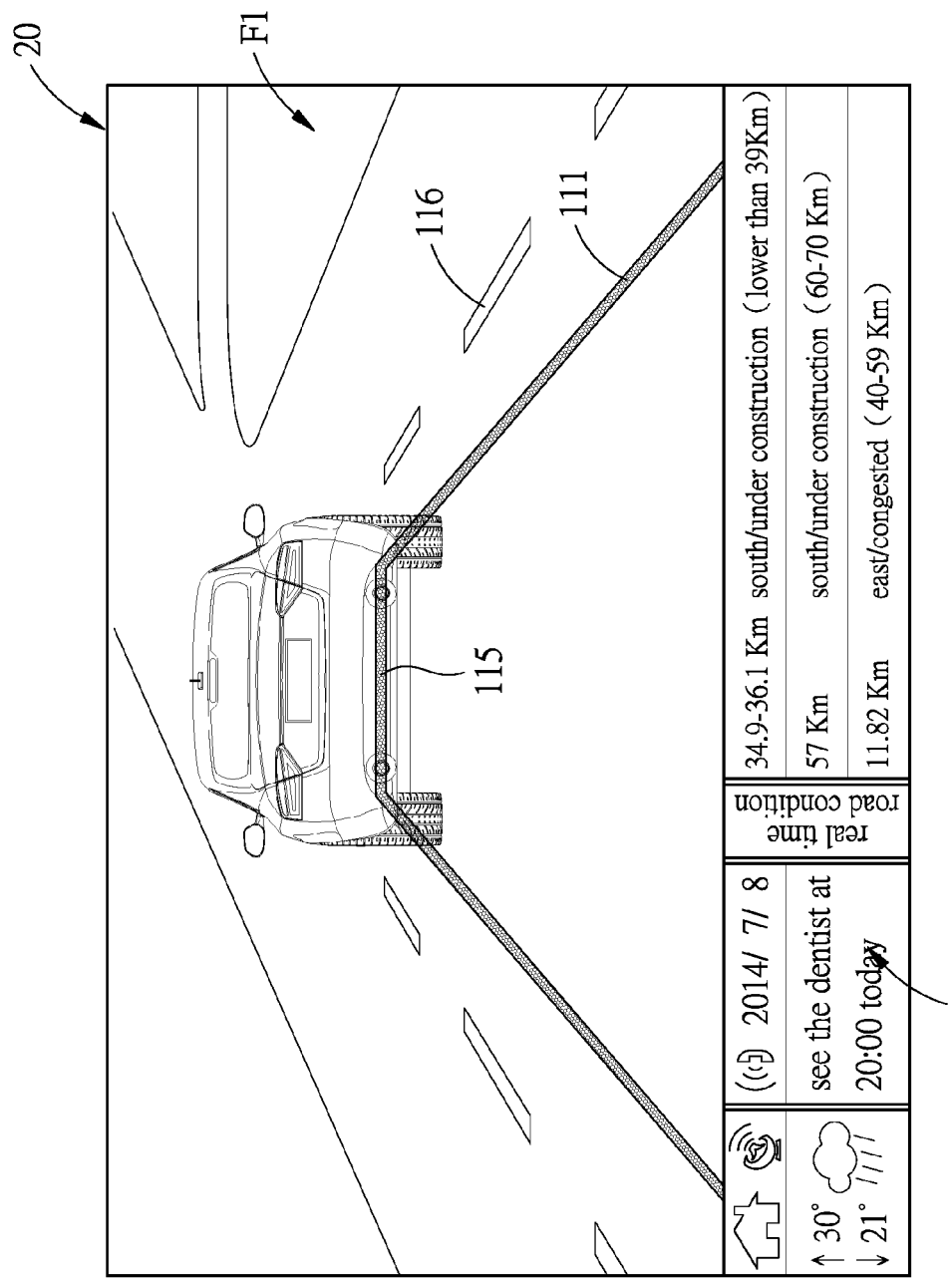
FIG. 7 is an illustrative view of the device shown in FIG. 6 showing that the distance between the host vehicle and the front vehicle is smaller than the safe distance.

The form of the safe-distance-to-the-front-vehicle marking 111 is not limited to the embodiment as disclosed above, and it can also be as shown in FIG. 5, wherein the border between the safe-distance-to-the-front-vehicle marking 111 and the area where the distance to the front vehicle is smaller than the safe distance is defined as a safe limit point S. When the speed of the vehicle changes, the safe-distance-to-the-front-vehicle marking 111 will change color or length to prompt the change of the safe distance. When the front vehicle does not move over the safe limit point S and into the safe-distance-to-the-front-vehicle marking 111, at this moment, the safe-distance-to-the-front-vehicle marking 111 is shown in two different colors, which means the vehicle is maintained at a safe distance. When the front vehicle move over the safe limit point S and into the safe-distance-to-the-front-vehicle marking 111, it means that the distance between the host vehicle and the front vehicle is smaller than the safe distance, at this moment, the safe-distance-to-the-front-vehicle marking 111 in a single color. As shown in FIGS. 2 and 6, the two safe limit points S between the two safe-distance-to-the-front-vehicle markings 111 are connected to form a separating marking 115, so as to the range of the safe-distance-to-the-front-vehicle markings 111 in a more obvious way, and the position of the separating marking 115 changes along with the change of the speed of the vehicle. As shown in FIG. 7, when the distance between the host vehicle and the front vehicle is smaller than the safe distance, the computer 10 can control the display unit 20 to display the road condition video F1 and the safe-distance-to-the-front-vehicle marking 111 only, which makes the driver focus on the safe-distance-to-the-front-vehicle marking 111, and can correctly and quickly adjust the vehicle to the safe distance.

The display unit 20 further includes a real time information display area 21 in which the real time road condition, real time weather or personal schedule can be displayed in the form of an excel file.

In addition to the portable display device, the display unit 20 can also be a projector which projects the images or video onto the windshield or the semitransparent panel beneath the windshield, which reduces the angle difference when the driver see the display unit 20 and the front road condition, so as to further improve the road condition responding.

In general, the present invention can use the display unit 20 to simultaneously display the road condition video F1 and the navigation information F2, meanwhile, the safe driving warning unit 11 can show safe driving related information, so that the driver can see sufficient safe driving information directly from the display unit 20 without having to look through the windshield to check the road condition, thus improving driving safety. Since the display unit 20 can display sufficient safe driving information, which reduces the cost of the device of the present invention, besides, the device of the present invention can be independently installed on any vehicle, so as to improve the applicability.

The embodiments disclosed above are exemplary only and not intended to limit the invention. Various modifications and changes can be made without departing from the scope of the present invention, for example, the straight line of the safe-distance-to-the-front-vehicle marking 111 can be changed to dotted line or double curved lines.

While we have shown and described various embodiments in accordance with the present invention, it is clear to those skilled in the art that further embodiments may be made without departing from the scope of the present invention.

What is claimed is:

1. A device capable of showing both navigation and safe driving warning information comprising:
    a computer;
    a display unit electrically connected to the computer;
    a video camera electrically connected to the computer to monitor the road condition in front of a host vehicle which is equipped with the device, images captured by the video camera being processed into a road condition video by the computer and then displayed on the display unit;
    a navigation unit electrically connected to the computer and having functions of destination guidance and route planning based on a planned destination, the computer being capable of processing the information from the navigation unit into navigation information which is then shown on the display unit, the navigation information including image data and text data, the road condition video and the navigation information being simultaneously displayed on the display unit in such a manner that the road condition video is displayed as a background and the road information floating over it, the computer including a safe driving warning unit which is controlled by the computer to display a safe-distance-to-the-front-vehicle marking on the display unit, and the safe-distance-to-the-front-vehicle marking to the front vehicle is displayed over the road condition video and includes two straight lines which change length when the host vehicle change speed;
    wherein the computer uses the safe driving warning unit to display a lane deviation warning marking which has two straight lines located at two sides of the safe-distance-to-the-front-vehicle marking for the user to determine whether the host vehicle deviates from a lane.

2. The device capable of showing both navigation and safe driving warning information as claimed in claim 1, wherein the safe-distance-to-the-front-vehicle marking is shown in two different colors.

3. The device capable of showing both navigation and safe driving warning information as claimed in claim 1, wherein the display unit further includes a real time information display area in which a real time road condition, a real time weather or a personal schedule can be displayed in the form of an excel file.

4. The device capable of showing both navigation and safe driving warning information as claimed in claim 1, wherein a border between the safe-distance-to-the-front-vehicle marking and the area where the distance to the front vehicle is smaller than the safe distance is defined as a safe limit point, two safe limit points between the safe-distance-to-the-front-vehicle markings are connected to form a separating marking, and the position of the separating marking changes along with the change of the speed of the host vehicle.

5. The device capable of showing both navigation and safe driving warning information as claimed in claim 1, wherein the computer includes an image recognition software which is capable of calculating a distance between the host vehicle and the front vehicle based on the image or video taken by the video camera, when the image recognition software figures out that the distance between the host vehicle and the front vehicle is smaller than the safe distance, the computer will make the safe-distance-to-the-front-vehicle marking flash.

6. The device capable of showing both navigation and safe driving warning information as claimed in claim 1, wherein the computer includes an image recognition software which is capable of calculating a distance between the host vehicle and the front vehicle based on the image or video taken by the video camera, when the image recognition software figures out that the distance between the host vehicle and the front vehicle is smaller than the safe distance, the computer will make the safe-distance-to-the-front-vehicle marking change color.

7. The device capable of showing both navigation and safe driving warning information as claimed in claim 1, wherein the computer includes an image recognition software which is capable of calculating a distance between the host vehicle and the front vehicle based on the image or video taken by the video camera, when the image recognition software figures out that the distance between the host vehicle and the front vehicle is smaller than the safe distance, the computer will control the display unit to display the road condition video and the safe-distance-to-the-front-vehicle marking only.

8. The device capable of showing both navigation and safe driving warning information as claimed in claim 1, wherein the computer includes an image recognition software which is capable of calculating a distance between the host vehicle and the front vehicle based on the image or video taken by the video camera, and the computer is electrically connected to an audio alarm, when the image recognition software figures out that the distance between the host vehicle and the front vehicle is smaller than the safe distance, the computer will make the audio warning unit produce an alarm in the form of a warning voice or a warning sound.

9. The device capable of showing both navigation and safe driving warning information as claimed in claim 1, wherein the display unit is a projector which projects images or video onto a windshield or a semitransparent panel beneath the windshield.

10. The device capable of showing both navigation and safe driving warning information as claimed in claim 1, wherein the computer includes an image recognition software which is capable of calculating an amount of deviation of the host vehicle from a lane, when the image recognition software figures out that the deviation amount is big enough to make the host vehicle overlapped with the road marking line, the computer will make the audio warning unit produce an alarm in the form of a warning voice or a warning sound.

* * * * *

UNITED STATES PATENT AND TRADEMARK OFFICE
CERTIFICATE OF CORRECTION

| | | |
|---|---|---|
| PATENT NO. | : 9,239,244 B1 | Page 1 of 1 |
| APPLICATION NO. | : 14/486572 | |
| DATED | : January 19, 2016 | |
| INVENTOR(S) | : Stephen Chen | |

It is certified that error appears in the above-identified patent and that said Letters Patent is hereby corrected as shown below:

Title Page item (73), the assignee should read: "E-Lead Electronics Co., Ltd., Changhua (TW)"

Signed and Sealed this
Second Day of August, 2016

Michelle K. Lee
*Director of the United States Patent and Trademark Office*